Aug. 24, 1943.　　　C. D. PETERSON ET AL　　　2,327,550
GEAR SHIFTING MECHANISM
Original Filed Feb. 8, 1940
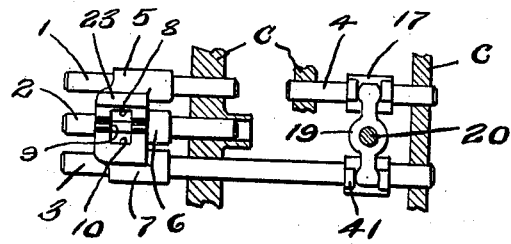
Fig-2-
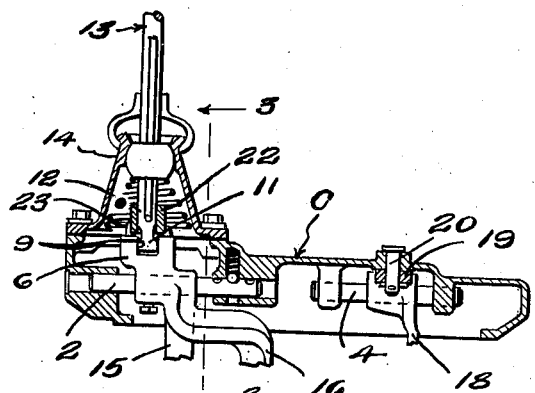
Fig-1-
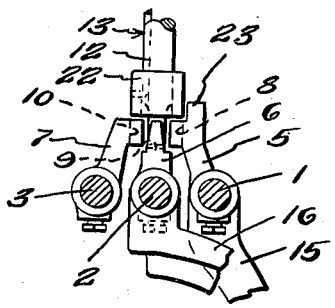
Fig-3-
Carl D. Peterson
Elmer J. Barth    INVENTORS
BY
    Bodell & Thompson,
        ATTORNEYS.

Patented Aug. 24, 1943

2,327,550

UNITED STATES PATENT OFFICE 2,327,550

GEAR SHIFTING MECHANISM

Carl D. Peterson and Elmer J. Barth, Toledo, Ohio, assignors to Spicer Manufacturing Corporation, Toledo, Ohio, a corporation of Virginia Original application February 8, 1940, Serial No. 317,906. Divided and this application September 27, 1941, Serial No. 412,634

2 Claims. (Cl. 74—473)

This invention relates to gear shifting mechanisms for change-speed gearings, and has for its object a gear shifting mechanism located in such a compact arrangement that a greater number of shift rods are located within practically the same space as in a shifting mechanism effecting gear the usual number of shifts, as for instance, the shift rods for five speeds forward and reverse gear shifts can be located in the same space or situation as gear shifts effecting three or four speeds forward and reverse. The shifting mechanism can be applied to the same size conventional or standard gear boxes, as required for transmission gearings having the less number of shifts.

A further object is a selecting and shifting mechanism in which the shifting lever has practically the same movment as the shifting lever in conventional transmission gearings having the less number of shifts. Usually the handle end of the gear shifting lever is pulled rearwardly for first speed forward and pushed forward in that path for reverse, and pushed forward from neutral in another path for second speed, and rearward in that last path for direct drive.

By "conventional movements" is meant the same movements, first and reverse effected by rear and forward movements respectively of the handle end of the shifting lever in the same path, and with direct drive effected in for instance a five speed transmission by the rearward movement of the handle end of the gear shifting lever and a forward movement in the same path for fourth speed forward, although in some instances, direct drive may be fourth speed, as when one of the indirect drives is an over drive. In all cases, direct drive is effected through the conventional rearward movement of the handle end of the gear shifting lever and first and reverse through a rearward and forward movement respectively of the handle end of the gear shifting lever.

The invention consists in the novel features and in the combinations and constructions hereinafter set forth and claimed.

In describing this invention, reference is had to the accompanying drawing in which like characters designate corresponding parts in all the views.

Figure 1 is a longitudinal sectional view through the cover of a transmission gearing showing the gear shifting mechanism in side elevation.

Figure 2 is a fragmentary plan view of a portion of the shifting mechanism.

Figure 3 is a fragmentary sectional view on line 3—3, Figure 1.

1, 2 and 3 designate three shift rods, and 4 an additional shift rod, these being mounted in suitable guide passages in the cover C usually applied to the open top side of the gear box. The rods 1, 2 and 3 have suitable blocks 5, 6 and 7 respectively formed with notches 8, 9 and 10 therein normally arranged in alinement for coacting with the finger 11 at the end of the lower arm 12 of the gear shifting lever 13. This lever is mounted in a tower 14 on the cover C to have a lateral selecting and a fore-and-aft shifting movement. It may be operated directly and provided with a handle at its upper end or indirectly by a handle lever on the steering column of the vehicle having the same movements as the lever 13. The blocks 5, 6 are provided with suitable forks 15, 16 respectively for shifting the first speed forward and reverse elements of the gearing and the second and third speeds forward. The additional rod 4 is provided with a block 17 having a fork 18 coacting with another shiftable element of the gearing to effect fourth speed and direct drive. The shift rod 3 is longer than or extends beyond the ends of the rods 1, 2 and the rod 4 is in line with the first and reverse shift rod 1.

Motion transmitting and reversing means is located between the longer rod 3 and the additional rod 4, this being here shown as a lever 19 pivoted at 20 between its ends to the cover C, one arm thereof coacting with the block 41 on the longer shift rod 3 and the other arm coacting with the block 17.

In operation, lateral movement of the gear shifting lever 13 to select the first and reverse rod 1 moves the finger 11 into the notch of the block 5, and rearward movement of the upper or handle end of the gear shifting lever 13 moves the finger 11 forwardly, effecting first speed forward. Forward movement from neutral in the same paths effects reverse speed. Incidentally, in selecting the rod 1, it is necessary to operate a locking device, as a sleeve 22, upwardly on the gear shifting lever to clear a shoulder 23 on the block 5 of the first and reverse shift rod 1. The gear shifting lever 13 normally stands with the finger 11 in the slot of the block 6 of the intermediate rod 2. Movement forwardly of the handle end of the gear shifting lever 13 shifts the finger 11 rearwardly, carrying the block 6, effecting second speed forward. Movement of the handle end of the gear shifting lever 13 rearward from neutral in the same path causes the fork 16 to effect a shift in the gearing producing third speed forward. Movement of the handle end of the gear shifting lever 13 laterally or to the right (Figure 3) causes the finger 11 to select the block 7 of the longer shift rod 3, and movement forwardly of the handle end of the gear shifting lever 13 causes the rod 3 to shift rearward and through the reversing lever 19 to shift the additional shift rod 4 forward producing fourth speed forward. Rearward movement of the handle end of the lever 13, when in this selected position, moves the finger 11 and the rod 3 forward, and hence the additional rod 4 rearward to effect direct drive. Thus, movement of the gear shifting lever for first and reverse and for direct drive are the same as in the conventional gear shift.

Owing to this construction, the gear shifting mechanism can be applied to conventional gear boxes and maintain the same conventional movements of the gear shifting lever.

This application is a division of application, Serial Number 317,906, filed February 8, 1940.

What we claim is:

1. A shifting mechanism for change-speed transmission gearing, said mechanism including parallel axially movable shift rods, a selecting and shifting lever having a lateral selecting movement to select any one of the rods and a fore-and-aft shifting movement to shift the selected rod, an additional rod, motion transmitting and reversing means between one of the former rods and the additional rod, and forks operated by the former rods and the additional rod, the additional rod being arranged in alinement with another of the former rods.

2. A shifting mechanism for change-speed transmission gearing, said mechanism including parallel axially movable shift rods, a selecting and shifting lever having a lateral selecting movement to select any one of the rods and a fore-and-aft shifting movement to shift the selected rod, one of the rods being longer than and extending beyond the other rods, an additional rod arranged in line with the shorter rod beyond the end of the same, motion transmitting and reversing means between the additional rod and the longer of the former rods, and forks operated by the rods.

CARL D. PETERSON.
ELMER J. BARTH.